United States Patent
Al-Hokayem et al.

(10) Patent No.: US 10,404,155 B2
(45) Date of Patent: Sep. 3, 2019

(54) MODEL PREDICTIVE DAMPING OF OSCILLATIONS IN AN ELECTRICAL CONVERTER SYSTEM

(71) Applicant: ABB Schweiz AG, Baden (CH)

(72) Inventors: Peter Al-Hokayem, Baden-Dättwil (CH); Ivan Pejcic, Lausanne (CH)

(73) Assignee: ABB Schweiz AG, Baden (CH)

( * ) Notice: Subject to any disclaimer, the term of this patent is extended or adjusted under 35 U.S.C. 154(b) by 6 days.

(21) Appl. No.: 15/687,206

(22) Filed: Aug. 25, 2017

(65) Prior Publication Data

US 2018/0054112 A1 Feb. 22, 2018

Related U.S. Application Data

(63) Continuation of application No. PCT/EP2016/050563, filed on Jan. 13, 2016.

(30) Foreign Application Priority Data

Feb. 25, 2015 (EP) .................................. 15156558

(51) Int. Cl.
*H02M 1/12* (2006.01)
*H02M 7/48* (2007.01)
(Continued)

(52) U.S. Cl.
CPC ............. *H02M 1/126* (2013.01); *H02M 1/12* (2013.01); *H02M 7/48* (2013.01); *H02P 21/14* (2013.01);
(Continued)

(58) Field of Classification Search
CPC .......... H02M 1/12; H02M 1/14; H02M 1/143; H02P 8/18; H02P 25/098; H02P 29/50
See application file for complete search history.

(56) References Cited

U.S. PATENT DOCUMENTS

| 8,766,570 B2 * | 7/2014 | Geyer ................ H02M 1/12 318/254.1 |
| 2014/0184135 A1* | 7/2014 | Bazzi .................. H02P 23/14 318/798 |
| 2018/0145579 A1* | 5/2018 | Spudic ................ H02M 1/12 |

FOREIGN PATENT DOCUMENTS

| EP | 2469692 A1 | 6/2012 |
| WO | 2014064141 A1 | 5/2014 |
| WO | 2014183930 A1 | 11/2014 |

OTHER PUBLICATIONS

Hernan Miranda et al., Model Predictive Current Control for High-Power Grid-Connected Converters with Output LCL Filter, IECON 2009—35th Annual Conference of IEEE Industrial Electronics, Nov. 3-5, 2009, 6 pages.
(Continued)

*Primary Examiner* — Bickey Dhakal
(74) *Attorney, Agent, or Firm* — Taft Stettinius & Hollister; J. Bruce Schelkopf

(57) ABSTRACT

A method for controlling an electrical converter system, including: determining a reference output ($\omega_m^*$) and an estimated output ($\omega_m$) of the electrical converter system based on measurements in the electrical converter system; determining an optimized pulse pattern ($u_{i,n}$) by selecting from a table of precalculated optimized pulse patterns, which is chosen based on the reference output ($\omega_m^*$) and the estimated output ($\omega_m$), a pulse pattern including a sequence of switching instants (t*) applied to the electrical converter system; determining a resonant oscillation ($\psi_{s,h}$) in the electrical converter system, the resonant oscillation ($\psi_{s,h}$) is composed of an electrical machine and a LC filter of the electrical converter system; determining a sequence of future states of the electrical converter system by solving a mathematical model of the electrical converter system subject to optimizing a cost function and subject to a constraint
(Continued)

that a modified pulse pattern ($u_i$) is applied to the electrical converter system, which modified pulse pattern ($u_i$) comprises time shifted switching instants with respect to the optimized pulse pattern ($u_{i,n}$), wherein the cost function comprises a term compensating the resonant oscillation ($\psi_{s,h}$) with a pulse response oscillation caused by the time shifted switching instants of the modified pulse pattern ($u_i$) and wherein the mathematical model is constrained such that the switching instants of the modified pulse pattern (ui) have the same order as the switching instants of the optimized pulse pattern (ui,n); applying the modified pulse pattern ($u_i$) to the electrical converter system.

20 Claims, 3 Drawing Sheets

(51) Int. Cl.
    *H02P 23/14* (2006.01)
    *H02P 21/14* (2016.01)
    *H02M 1/00* (2006.01)
    *H02M 7/5387* (2007.01)

(52) U.S. Cl.
    CPC ..... *H02P 23/14* (2013.01); *H02M 2001/0012* (2013.01); *H02M 2007/53876* (2013.01)

(56) References Cited

OTHER PUBLICATIONS

Jose Rodriguez et al., State of the Art of Finite Control Set Model Predictive Control in Power Electronics, IEEE Transactions on Industrial Informatics, IEEE Service Center, vol. 9, No. 2, May 1, 2013, 14 pages.
Extended European Search Report, European Patent Application No. 15156558.7, dated Sep. 23, 2015, 9 pages.
International Search Report and Written Opinion, PCT/EP2016/050563, ABB Technology AG, dated Mar. 31, 2016, 10 pages.
G. Buja. Optimum output waveforms in pwm inverters. Industry Applications, IEEE Transactions on, IA-16(6):830-836, Nov. 1980.
P. Cortes, J. Rodriguez, D. Quevedo, and C. Silva. Predictive current control strategy with imposed load current spectrum. Power Electronics, IEEE Transactions on, 23(2):612-618, Mar. 2008.
C. Fischer, S. Mariethoz, and M. Morari. A model predictive control approach to reducing low order harmonics in grid inverters with LCL filters. In Industrial Electronics Society, IECON 2013—39th Annual Conference of the IEEE, pp. 3252-3257, Nov. 2013.
T. Geyer. Generalized model predictive direct torque control: Long prediction horizons and minimization of switching losses. In Decision and Control, 2009 held jointly with the 2009 28th Chinese Control Conference. CDC/CCC 2009. Proceedings of the 48th IEEE Conference on, pp. 6799-6804, Dec. 2009.
T. Geyer. A comparison of control and modulation schemes for medium-voltage drives: Emerging predictive control concepts versus field oriented control, Sep. 2010.
T. Geyer. Computationally efficient model predictive direct torque control. Power Electronics, IEEE Transactions on, 26(10):2804-2816, Oct. 2011.
T. Geyer. Model predictive direct current control: Formulation of the stator current bounds and the concept of the switching horizon. Industry Applications Magazine, IEEE, 18(2):47-59, Mar. 2012.
T. Geyer, N. Oikonomou, G. Papafotiou, and F. Kieferndorf. Model predictive pulse pattern control. Industry Applications, IEEE Transactions on, 48(2):663-676, Mar. 2012.
T. Geyer, G. Papafotiou, and M. Morari. Model predictive direct torque control; Part I: Concept, algorithm, and analysis. Industrial Electronics, IEEE Transactions on, 56(6):1894-1905, Jun. 2009.
R. Gondhalekar, C. Jones, T. Besselmann, J. Hours, and M. Mercangoz. Constrained spectrum control using MPC. In Decision and Control and European Control Conference (CDC-ECC), 2011 50th IEEE Conference on, pp. 1219-1226, Dec. 2011.
P. Hokayem, T. Geyer, and N. Oikonomou. LQR-based active damping for model predictive pulse pattern. ECCE, 2014.
J. Hours, M. Zeilinger, R. Gondhalekar, and C. Jones. Spectrogram-MPC: Enforcing hard constraints on systems' output spectra. In American Control Conference (ACC), 2012, pp. 2010-2017, Jun. 2012.
M. Malinowski and S. Bernet. A simple voltage sensorless active damping scheme for three-phase PWM converters with an filter. Industrial Electronics, IEEE Transactions on, 55(4):1876-1880, Apr. 2008.
S. Mastellone, G. Papafotiou, and E. Liakos. Model predictive direct torque control for MV drives with LC filters. In Power Electronics and Applications, 2009. EPE '09. 13th European Conference on, pp. 1-10, Sep. 2009.
N. Oikonomou, C. Gutscher, P. Karamanakos, F. Kieferndorf, and T. Geyer. Model predictive pulse pattern control for the five-level active neutral-point-clamped inverter. Industry Applications, IEEE Transactions on, 49(6):2583-2592, Nov. 2013.
G. Papafotiou, J. Kley, K. Papadopoulos, P. Bohren, and M. Morari. Model predictive direct torque control; Part II: Implementation and experimental evaluation. Industrial Electronics, IEEE Transactions on, 56(6):1906-1915, Jun. 2009.
A. Rathore, J. Holtz, and T. Boller. Synchronous optimal pulsewidth modulation for lowswitching-frequency control of medium-voltage multilevel inverters. Industrial Electronics, IEEE Transactions on, 57(7):2374-2381, Jul. 2010.
J. Scoltock, T. Geyer, and U. Madawala. Model predictive direct current control for a gridconnected converter: LCL-filter versus L-filter. In Industrial Technology (ICIT), 2013 IEEE International Conference on, pp. 576-581, Feb. 2013.
J. Scoltock, T. Geyer, and U. Madawala. Model predictive direct power control for a gridconnected converter with an LCL-filter. In Industrial Technology (ICIT), 2013 IEEE International Conference on, pp. 588-593, Feb. 2013.
I. Takahashi and T. Noguchi. A new quick-response and high-efficiency control strategy of an induction motor. Industry Applications, IEEE Transactions on, IA-22(5):820-827, Sep. 1986.
J. Wiseman, B. Wu, and G. S. P. Castle. A PWM current-source rectifier with active damping for high power medium voltage applications. In Power Electronics Specialists Conference, 2002. pesc 02. 2002 IEEE 33rd Annual, vol. 4, pp. 1930-1934, 2002.
E. Wu and Lehn. Digital current control of a voltage source converter with active damping of LCL resonance; Power Electronics, IEEE Transactions on, 21(5):1364-1373, Sep. 2006.
F. Blaschke. The principle of field orientation applied to the new transvector closed-loop control system for rotating field machines. Siemens Rev., 39:217-220, 1972.

* cited by examiner

MODEL PREDICTIVE DAMPING OF OSCILLATIONS IN AN ELECTRICAL CONVERTER SYSTEM

FIELD OF THE INVENTION

The invention relates to the field of control of power converters. In particular, the invention relates to a method, a computer program, a computer-readable medium and a controller for controlling an electrical converter system. Furthermore, the invention relates to an electrical converter system.

BACKGROUND OF THE INVENTION

Operating an electrical power converter, which is used in a medium-voltage electrical system comprising the electrical converter and an electrical machine, with optimized pulse patterns may cause higher current harmonics supplied to the electrical machine. To reduce the negative effects caused by the higher harmonics, an LC filter may be installed between the output of the electrical converter and the electrical machine. While the filter attenuates the harmonic content that is fed to the electrical machine, it may introduce a resonant behavior into the electrical drive system. Usually, this resonant behavior is treated by using an additional active damping controller working independently from the main tracking controller, which selects the optimized pulse patterns to be applied to the electrical converter.

Since the electrical machine is supplied by the electrical converter with finite number of voltage levels, the performance of the electrical system during steady state may be described by Total Harmonic Distortion (THD). Its value quantifies the distortion of the stator currents from ideal sinusoidal shape. The steady state stator currents are characterized by fundamental harmonics responsible for the conversion of electrical energy to mechanical energy, and higher harmonics which are the consequence of the switching nature of the electrical converter. Higher current harmonics usually cause harmonic losses in the electrical machine. As a consequence of higher losses, electrical machines need to be oversized which leads to a higher price. Moreover, the increased losses caused by higher current harmonics may prevent the installation of power converters to DOL (Direct On-Line) electrical machines that are designed to work via a direct connection to the power grid.

One of the possibilities for reducing the steady state current distortion would be the insertion of an LC filter between the electrical converter and the electrical machine. This kind of filter may cause a very strong attenuation rate of higher stator current harmonics, and may open the possibility of obtaining much lower current distortion. However, the insertion of an LC filter may introduce a resonant behavior into the electrical system. One way to overcome the problem with the introduced resonant behavior may be the addition of a resistive element in a serial connection to a filter capacitor. This concept is known as passive damping. However, the addition of the resistive element may also cause a weaker attenuation rate of higher current harmonics provided by the filter. Moreover, the inserted resistive element R dissipates energy and therefore reduces the energy efficiency of the system.

A more suitable way to solve the problem of the resonant behavior introduced by the LC filter is by using appropriate damping control. This way, it is not necessary to insert the resistive element R and the powerful attenuation of higher current harmonics is preserved. These solutions are mostly based on an additional damping loop. The additional damping loop comprises an auxiliary controller which provides the damping correction of reference as a reaction to measurements filtered around resonant frequency.

Recently, there has been a growing interest in the application of predictive control in power electronics. The developed predictive control schemes applied to medium voltage electrical systems demonstrated a considerable improvement of performance in comparison to the previous control methods. The advantages are related both to better dynamic performance during transients, as well as better steady state behavior. For example, WO 2014 183930 A1 and WO 2014 064141 A1 relate to model predictive control of electrical converter systems.

EP 2 469 692 A1 discloses a method for controlling an electrical converter system determining a reference output and an estimated output of the electrical converter system based on measurements in the electrical converter system and determining an optimized pulse pattern by selecting from a table of precalculated optimized pulse patterns, which is chosen based on the reference output and the estimated output.

DESCRIPTION OF THE INVENTION

It is an objective of the invention to provide a control method for an electrical converter system interconnected with a resonant system that results in low THD and that demands low computing power from a controller performing the method.

This objective is achieved by the subject-matter of the independent claims. Further exemplary embodiments are evident from the dependent claims and the following description.

An aspect of the invention relates to a method for controlling an electrical converter system, which may comprise an electrical converter interconnected via a resonant subsystem with an electrical machine (such as a generator or a motor). Alternatively, the electrical converter system may interconnect two electrical networks, i.e. one of the electrical networks may be seen as a load analogously to an electrical machine. In the second case, the control method may be performed based on virtual fluxes and/or virtual torques of the electrical network.

According to an embodiment of the invention, the method comprises: determining a reference output and an estimated output of the electrical converter system based on measurements in the electrical converter system; determining an optimized pulse pattern from a table of precalculated optimized pulse patterns based on the reference output and the estimated output, a pulse pattern comprising a sequence of switching instants applied to the electrical converter system; determining a resonant oscillation in the electrical converter system, whereby the resonant oscillation is composed of an electrical machine and a LC filter of the electrical converter system; determining a sequence of future states of the electrical converter by solving the mathematical model of the electrical converter system subject to optimizing a cost function and subject to a constraint that a modified pulse pattern is applied to the electrical converter system, which modified pulse pattern comprises time shifted switching instants with respect to the optimized pulse pattern, wherein the cost function comprises a term compensating the resonant oscillation with a pulse response oscillation caused by the time shifted switching instants of the modified pulse pattern; and applying the modified pulse pattern to the electrical converter.

Summarized, the control method uses model predictive control to modify a precalculated optimized pulse pattern in such a form that resonant oscillations are damped.

Firstly, an optimized pulse pattern is determined by selecting from a precalculated table of optimized pulse patterns, which is chosen based on the reference output and the estimated output, which for example may be a reference torque and an estimated torque. After that, the control method solves a mathematical model of the electrical converter system, which usually are discretized and linearized differential equations describing the electrical converter system, while optimizing a cost function, which comprises a term compensating resonant oscillations. The resonant oscillations are compensated with so called pulse response oscillations that are caused by time shifting switching instants of the optimized pulse pattern and that may be determined analytically as described below. Usually, the future behaviors of the electrical converter system is calculated over a time horizon comprising more than one next switching instants. However, only the next future switching instants is applied to the electrical converter system. After that, the method is repeated for determining the following switching instants.

The control method is based on an analytical relation between the undesired spectral content introduced by resonance (i.e. the resonant oscillations) and inverter pulses (i.e. pulse response oscillations). Furthermore, the control method is based on an optimization problem that selects an optimal trajectory which minimizes the spectral content around the resonance. The linearization of the analytical relation between inverter pulses and the resonant spectral content allows a formulation of the optimization problem in the form of Quadratic Programming (QP) which is computationally tractable for on-line computation.

The control method and a corresponding controller are designed without an additional outer damping loop. This way, the controller may directly plan how to bring the electrical converter system to a given steady state in an optimal way. In particular, the controller may plan for minimal excitation of the resonant oscillation during transients. With the control method, a frequency-domain objective (damping) and a time-domain objective (reference tracking) are achieved with only one control loop.

According to an embodiment of the invention, the resonant oscillation in the electrical converter system is determined by determining coefficients of a predetermined homogeneous solution of the mathematical model of the electrical converter system, wherein the coefficients are determined based on measurements in the electrical converter system. For an LC filter, below the homogeneous solution is described in equation (17) with coefficients in equation (16). In general, the homogeneous solution may be based on a linear combination of a sin and cos function with coefficients dependent on electrical parameters of the electrical converter system.

According to an embodiment of the invention, the resonant oscillation is caused by a resonant filter, or more general a resonant subsystem. The resonant filter may be an LC or LCL filter.

According to an embodiment of the invention, the pulse response oscillation is based on a solution of the mathematical model with respect to voltage pulses resulting from a difference between the optimized pulse pattern and the modified pulse pattern. Below, a specific solution for a pulse response oscillation is described in equation (26). For every time shifted switching instant of the modified pulse pattern, the pulse response oscillation comprises an oscillatory term depending on the time shift.

According to an embodiment of the invention, the term compensating the resonant oscillation with the pulse response oscillation is based on the norm of the sum of a function of the resonant oscillation and a function of the pulse response oscillation. The control method solves the mathematical model of the electrical converter system by optimizing the cost function in such a way, that the compensation term is minimized and therefore, the resonant oscillation determined for the system is compensated with the pulse response oscillation, which may be adjusted by time shifting switching instants of the pulse pattern.

According to an embodiment of the invention, the mathematical model is based on a differential equation of a stator flux, the future states are future stator fluxes, and/or the resonant oscillation and/or the pulse response oscillation are an oscillation of a stator flux. When using stator fluxes as basic variables of the mathematical model, the differential equations of the mathematical model become second order differential equations.

According to an embodiment of the invention, the cost function comprises a term minimizing the time shifts of the switching instants of the modified pulse pattern with respect to the optimized pulse pattern. By not only minimizing the reference tracking and the resonant oscillations but also the time shifts of the modified pulse pattern, the control method may be forced to deviate from the precalculated optimized pulse pattern as less as possible. In such a way, other beneficial properties of the optimized pulse pattern may be maintained, while not being explicitly accounted for in the cost function.

According to an embodiment of the invention, the cost function comprises a term minimizing a difference between a flux error and a correction flux representing the influence of the time shifted switching instants of the modified pulse pattern. This term is responsible for the reference tracking. In other words, the method tries to compensate the flux error, which may be determined based on measurements in the electrical converter system, with corrections resulting from time shifting the switching instants of the pulse pattern.

According to an embodiment of the invention, the flux error is the difference of a reference flux predetermined for the optimized pulse pattern and an estimated flux estimated from a previously applied modified pulse pattern. The reference flux may be stored together with the precalculated optimized pulse pattern. The estimated flux may be estimated from the previously applied pulse pattern(s). In such a way, the flux error does not depend on the time shifts of the modified pulse pattern and has not be optimized with the other variables.

According to an embodiment of the invention, the mathematical model is constrained such that the switching instants of the modified pulse pattern have the same order as the switching instants of the optimized pulse pattern. The number of switching instants and their order of the pulse pattern is not modified by the method.

According to an embodiment of the invention, wherein the reference output and the estimated output are a reference speed and an estimated speed and/or a reference torque and an estimated torque, and/or a reference flux and an estimated flux, of a load and/or a resonant filter of the electrical converter system. In general, output or system output may refer to variables that are output by the electrical converter system (and input to the control method and/or the controller).

According to an embodiment of the invention, the sequence of future states is determined every time instant over a horizon of more than one time instant. As already mentioned above, the method may be based on a moving horizon. The interested quantities, such as correction flux and/or time shifts of the pulse pattern are calculated and/or optimized over a horizon of fixed length that may comprise more than the next switching instant. However, only the switching instants determined for the next time instant are applied to the electrical converter system.

Further aspects of the invention relate to a computer program, which, when being executed by a processor, is adapted to carry out the steps of the method as described in the above and in the following, and to a computer-readable medium, in which such a computer program is stored.

A computer-readable medium may be a floppy disk, a hard disk, an USB (Universal Serial Bus) storage device, a RAM (Random Access Memory), a ROM (Read Only Memory), an EPROM (Erasable Programmable Read Only Memory) or a FLASH memory. A computer-readable medium may also be a data communication network, e.g. the Internet, which allows downloading a program code. In general, the computer-readable medium may be a non-transitory or transitory medium.

A further aspect of the invention relates to a controller that is adapted for performing the method as described in the above and in the following. The control method may be implemented on any computational hardware including DSPs, FPGAs, microcontroller, CPUs, GPUs, multi-core platforms, and combinations thereof.

A further aspect of the invention relates to an electrical converter system, which comprises an electrical converter, a resonant system interconnected with the converter and a controller adapted for determining resonant oscillations caused by the resonant system and for damping the resonant oscillations in the electrical converter system by performing the method as described above and in the following. For example, the resonant subsystem is or may comprise an LC-filter. The electrical converter system may be interconnected via the resonant subsystem with a load and/or power source, such as an electrical machine or an electrical gird.

It has to be understood that features of the method, the computer program and the computer-readable medium as described in the above and in the following may be features of the electrical converter system as described in the above and in the following, and vice versa.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Converter System

Figure 1:
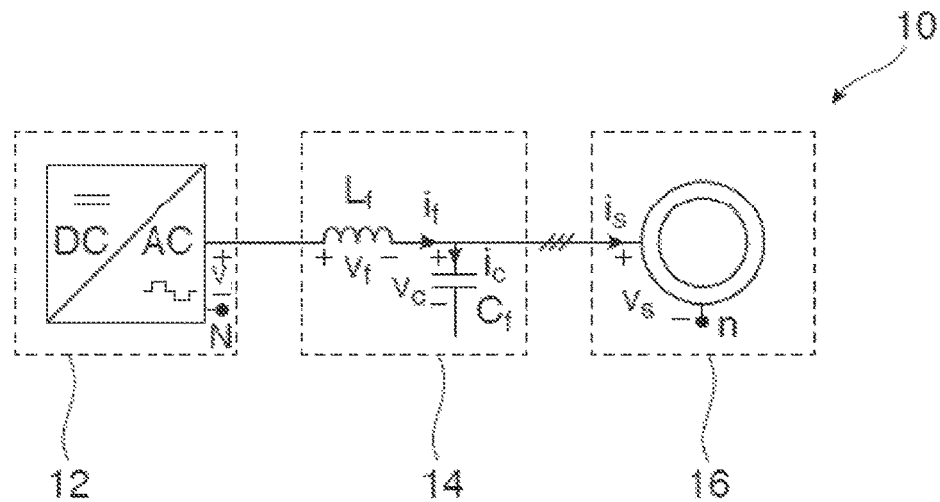
FIG. 1 schematically shows an electrical converter system according to an embodiment of the invention.

FIG. 1 shows an electrical converter system 10 with an inverter (DC-to-AC converter) 12 connected on an output side via an LC filter 14 with a rotating electrical machine 16, such as a generator or electrical motor. As indicated, the converter 12 may have a three-phase output. However, the converter system 10 also may be a single phase system.

The inverter 12 produces an N-level output voltage, which is smoothed by the LC filter 14, which comprises a filter inductor $L_f$ connected between the converter 12 and the rotating electrical machine 16. A filter capacitor $C_f$ connects one side of the filter inductor $L_f$ with the earth or the neutral point n. It has to be understood that in a multi-phase system, the filter inductor $L_f$ and filter capacitor $C_f$ may comprise a number of physical inductors and capacitors corresponding to the number of phases.

In order to exploit the strong attenuation of higher current harmonics introduced by the LC filter 14, it may be necessary to suppress the resonant spectrum existing in the electrical converter system 10. This will be achieved by predictive control which considers the amount of resonant spectrum at the beginning of the predictive horizon and optimizes for its elimination. This kind of approach will be referred to as predictive damping.

Controller and Control Method

Figure 2:
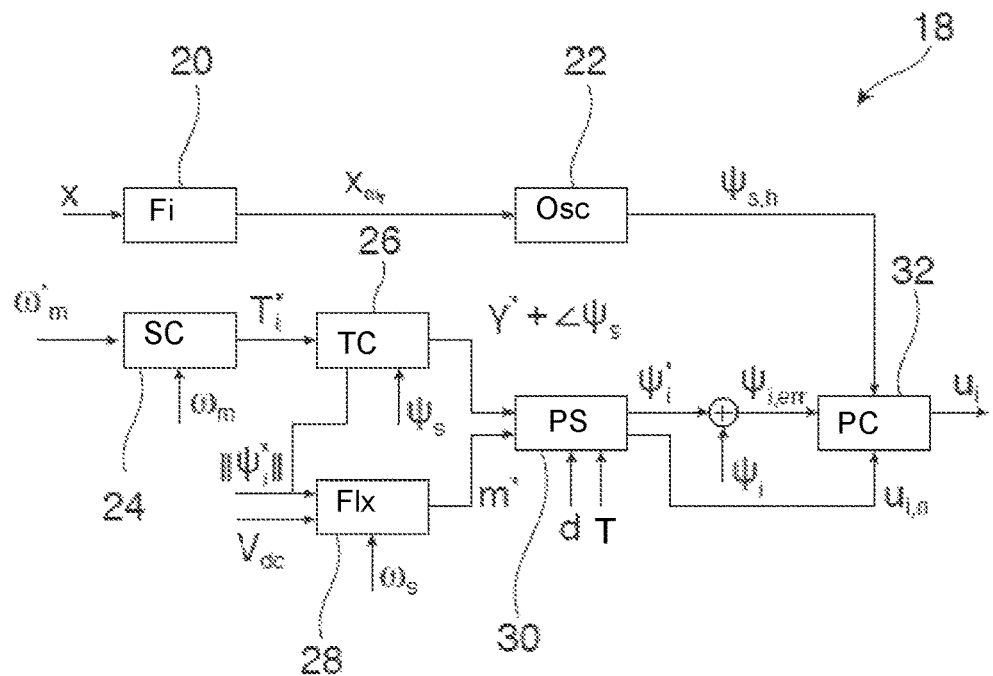
FIG. 2 schematically shows a controller and control method according to an embodiment of the invention.

The electrical converter system 10 may be controlled by a controller 18 shown in FIG. 2. The diagram shown in FIG. 2 also may be seen as a diagram for a control method, whereas the modules of the controller 18 may be seen as method steps of a control method.

A filtering module/step 20 (Fi) receives measurement values and/or system output x and generates the filtered values $$x_{\omega_r} = \begin{bmatrix} v_{c,\omega_r} \\ i_{c,\omega_r} \end{bmatrix}, \tag{1}$$

which in an oscillation module/step 22 (Osc) are subsequently used for calculating the resonant oscillation $\psi_{s,h}$ existing in the system at the beginning of the prediction horizon.

Since the filter module/step 20 may introduce a certain phase shift at the resonant frequency $\omega_r$, this phase shift may be compensated by changing the angle of $\psi_{s,h}$.

In modules/steps 20 and 22, a resonant oscillation $\psi_{s,h}$ in the electrical converter system is determined. The exact form of the resonant oscillation $\psi_{s,h}$ for the system 10 is derived below in section "Homogeneous Solution".

In the speed controller module/step 24 (SC), a reference speed $\omega_m^*$ (which is an example of a reference system output) and an estimated speed $\omega_m$ (which is an example of an estimated system output) are received. The estimated speed $\omega_m$ may have been determined based measurements in the electrical converter system 10.

The speed controller module/step 24 (SC) determines a reference torque $T_i^*$, which together with an estimated stator flux $\psi_s$ and a magnitude of the reference inverter flux $\psi_i^*$ is used in a torque controller module/step 26 (TC) for determining a reference angle $<\psi_s+\gamma^*$ for the inverter flux.

A flux controller module/step 28 (Flx) receives a magnitude of the reference inverter flux $\psi_i^*$, the DC link voltage $V_{DC}$ and determines a modulation index, which is used by a pattern selector module 30 (PS) together with the reference angle and a pulse number d for selecting a precalculated optimized pulse pattern $u_{i,n}$ from a table T of pulse patterns.

The difference of a reference inverter flux $\psi_i^*$, which may be provided based on the selected optimized pulse pattern $u_{i,n}$ by the pattern selector module/step 30 (PS) and an estimated inverter flux $\psi_i$, which may be seen as flux error $\psi_{i,err}$, may be input to a pattern controller module/step (PC) 32, which based on the resonant oscillation $\psi_{s,h}$ and the optimized pulse pattern $u_{i,n}$ determines a modified pulse pattern $u_i$.

The pattern controller module/step 32 (PC) determines a sequence of future states of the electrical converter system 10 by solving a mathematical model of the electrical converter system 10 subject to optimizing a cost function and subject to a constraint that a modified pulse pattern is applied to the electrical converter system 10. The mathematical model is described in more detail in the following section "Mathematical Model". The constraints and the cost functions are described in more detail in the following section "Optimization problem".

The pattern controller module/step 32 (PC) may solve this problem as a quadratic programming.

The modified pulse pattern $u_i$ comprises time shifted switching instants with respect to the optimized pulse pattern $u_{i,n}$, wherein the cost function comprises a term compensating the resonant oscillation with a pulse response oscillation caused by the time shifted switching instants of the modified pulse pattern $u_i$.

In the end, the modified pulse pattern $u_i$ is applied to the electrical converter 12, wherein only the next time period $T_s$ is applied to the electrical converter 12. The control method shown in FIG. 2 providing predictive damping may be executed with a time period $T_s$. However, the future switching instants of the modified pulse pattern $u_i$ may be calculated over a horizon longer than the time period $T_s$.

Mathematical Model

Referring to FIG. 1, the following equations hold:

$$v_i = v_s + v_f \quad (2)$$

$$= \frac{d\psi_s}{dt} + L_f \frac{di_f}{dt} \quad (3)$$

$$= \frac{d\psi_s}{dt} + L_f \frac{di_c}{dt} + L_f \frac{di_s}{dt} \quad (4)$$

whose stator $i_s$ and capacitor $i_c$ current can be expressed as $$i_s = \frac{1}{L_\sigma}\psi_s - \frac{1}{L_\sigma}\frac{L_m}{L_r}\psi_r \quad (5)$$

$$i_c = C_f \frac{dv_s}{dt} = C_f \frac{d^2\psi_s}{dt^2} \quad (6)$$

Substituting the expressions for $i_s$ and $i_c$ into (3), we obtain $$v_i = L_f C_f \frac{d^3\psi_s}{dt^3} + \left(1 + \frac{L_f}{L_\sigma}\right)\frac{d\psi_s}{dt} - L_f \frac{1}{L_\sigma}\frac{L_m}{L_r}\frac{d\psi_r}{dt} \quad (7)$$

where after introducing the coefficients $$k_1 = L_f C_f \quad k_2 = 1 + \frac{L_f}{L_\sigma} \quad k_3 = L_f \frac{1}{L_\sigma}\frac{L_m}{L_r} \quad (8)$$

we obtain $$v_i = k_1 \frac{d^3\psi_s}{dt^3} + k_2 \frac{d\psi_s}{dt} - k_3 \frac{d\psi_r}{dt}. \quad (9)$$

By assuming zero initial conditions and integrating both sides of differential equation (6), the following form is obtained $$\psi_i = k_1 \frac{d^2\psi_s}{dt^2} + k_2\psi_s - k_3\psi_r. \quad (10)$$

Consequently, the damping of the resonance in the stator flux also damps the resonance in the stator current and provides the desired low current THD.

Predictive Damping

Predictive damping of the electrical converter system 10 will be achieved by decomposing the response to three parts. These are the nominal particular solution $\psi_{s,n}$, the homogeneous solution $\psi_{s,h}$ and the pulse response $\psi_{s,p}$.

The nominal solution $\psi_{s,n}$ is the desired steady state response which gives the best THD. It is the particular solution of (10) when the precomputed optimal input $\psi_{i,n}$ is applied. The nominal input $\psi_{i,n}$ will be generated by using optimized pulse patterns (OPP)s. Most importantly, the response $\psi_{s,n}$ is the particular solution which does not include any spectral content detrimental for current THD. The $\psi_{s,n}$ part of response is described in section "Nominal Solution".

The homogeneous solution $\psi_{s,h}$ is the oscillation at the resonant frequency which deteriorates the THD. It is the homogeneous solution of (10). This part of response constitutes the unwanted spectral content which taints the THD. The $\psi_{s,h}$ is analysed in the section "Homogeneous Solution".

The pulse response $\psi_{s,p}$ is the system reaction to additional voltage pulses at the input. It is obtained from (9) with a pulse of voltage as input. This response has two parts, $\bar{\psi}_{s,p}$ and $\tilde{\psi}_{s,p}$, which affect the nominal $\psi_{s,n}$ and the homogeneous $\psi_{s,h}$ solution, respectively. Essentially, the component $\bar{\psi}_{s,p}$ is part of the inverter flux which is used to achieve nominal steady-state. The component $\tilde{\psi}_{s,p}$ affects the unwanted oscillation in the homogeneous solution, and it is used for predictive damping. This component $\tilde{\psi}_{s,p}$ of pulse response is derived in section "Pulse Response".

$\psi_{s,n}$—Nominal Solution

The nominal solution $\psi_{s,n}$ is the steady state operation with the best current THD. As such, it does not involve any unwanted spectrum which might be introduced by the resonant behavior. It is the best particular solution of the differential equation, and it satisfies (10) such that $$\psi_{i,n} = k_1 \frac{d^2 \psi_{s,n}}{dt^2} + k_2 \psi_{s,n} - k_3 \psi_{r,n} \tag{11}$$

where $\psi_{i,n} \in \mathbb{R}^2$ is the nominal input trajectory which gives best current THD. It is obtained as $$\psi_{i,n}(t) = \psi_{i,n}(0) + \int_0^t v_{i,n}(t)dt \tag{12}$$

where $v_{i,n}$ the is the precomputed OPP, and the constant $v_{i,n}(0)$ is chosen such that the trajectory is centered around the origin of $\alpha\beta$ frame.

The purpose of control method is to bring the electrical control system 10 to the nominal steady state. Observed from the frequency domain, the nominal solution $\psi_{s,n}$ is the one which does not involve any detrimental spectrum which can be introduced by the resonant behavior. The absence of this part of the spectrum is the reason for the best value of current THD.

The nominal solution $\psi_{s,n}$ represents only one of the possible particular solutions. Another particular solution, different from the nominal, is obtained by adding the homogeneous solution. This introduces the resonant spectrum part which deteriorates THD and may cause instability. The homogeneous solution will be described in the following section.

$\psi_{s,h}$—Homogeneous Solution

The homogeneous solution $\psi_{s,h}$ is the source of oscillations in the system composed of the electrical machine and LC filter. It can coexist in steady state with the nominal solution, and as an oscillation at resonant frequency it adds the detrimental spectral content which increases THD. It satisfies $$0 = k_1 \frac{d^2 \psi_{s,h}}{dt^2} + k_2 \psi_{s,h} \tag{13}$$

which is homogeneous equation of (10). The homogeneous solution is $$\psi_{s,h} = C_1 \cos(\omega_r t) + C_2 \sin(\omega_r t) \tag{14}$$

where $C_1 \in \mathbb{R}^2$ and $C_2 \in \mathbb{R}^2$ are arbitrary constants. The frequency $$\omega_r = \sqrt{\frac{k_2}{k_1}} = \sqrt{\frac{L_f + L_\sigma}{L_f L_\sigma C_f}} \tag{15}$$

represents the resonant frequency, which is also known as the natural frequency of the system.

The arbitrary constants $C_1$ and $C_2$ can be obtained as $$C_1 = -\frac{1}{\omega_r^2 C_f} i_{c,\omega_r}(0) \tag{16}$$

$$C_2 = \frac{1}{\omega_r} v_{s,\omega_r}(0)$$

for the arbitrary constants calculated from filtered measurements. After plugging them back to (14), the expression $$\psi_{s,h}(t) = -\frac{1}{\omega_r^2 C_f} i_{c,\omega_r}(0)\cos(\omega_r t) + \frac{1}{\omega_r} v_{s,\omega_r}(0)\sin(\omega_r t) \tag{17}$$

describing the oscillation of homogeneous solution is obtained. It will be useful to notice at this point that as the capacitor and stator voltage are equal, one can replace $v_{s,\omega_r}(0)$ by $v_{c,\omega_r}(0)$.

The problem in the control arises because the following of nominal input trajectory $\psi_{i,n}$ does not immediately imply the nominal stator flux $\psi_{s,n}$ as a particular solution. The nominal stator flux $\psi_{s,n}$ is only one possible particular solution, and by adding any homogeneous solution to it the new particular solution $$\psi_s = \psi_{s,n} + \psi_{s,h} \tag{18}$$

is obtained. The undesired spectrum gets introduced to the system by the homogeneous solution $\psi_{s,h}$.

$\psi_{s,p}$—Pulse Response

The pulse response $\psi_{s,p}$ is the reaction of the system 10 to a voltage pulse at the input. Its importance is that it corresponds to corrective pulses coming as deviations from nominal input $v_{i,n}$.

Figure 3:
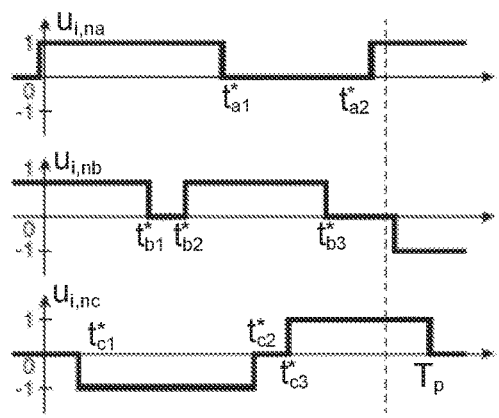
FIG. 3 shows a diagram with switching instants for an optimized pulse pattern used in the method of FIG. 2.

An example of switching transitions over a prediction horizon $T_p$ of a pulse pattern $u_{i,n}$, which switches the nominal input $v_{i,n}$, are shown in FIG. 3. In particular, the phases a, b, c are switched at the switching instants (switching times) $t^*_{a1}$, $t^*_{a2}$, $t^*_{b1}$, etc.

Figure 4:
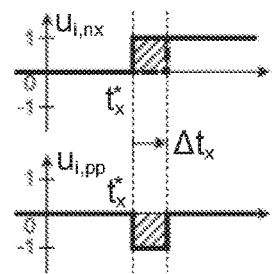
FIG. 4 shows a diagram indicating time shifts of switching instants used in the method of FIG. 2.
Figure 6:
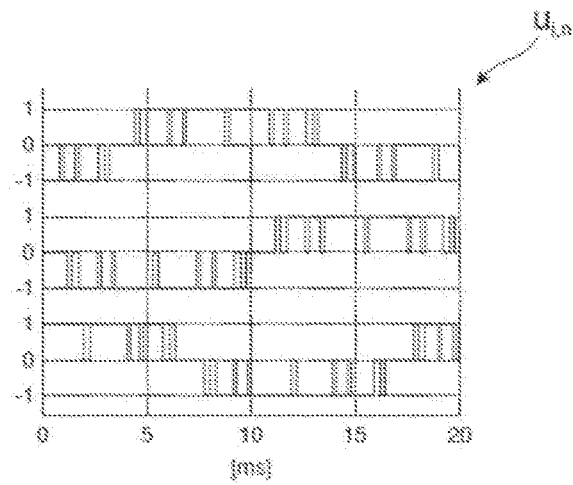
FIG. 6 shows a diagram with an optimized pulse pattern used in the method of FIG. 2.

For deriving the first pulse response $\psi_{s,p}$ caused by all correction pulses, a response $\psi_{s,pp}$ to a single pulse will be first computed. Consider a single correction pulse $\Delta t_x$ in phase $x \in \{a, b, c\}$ at the nominal switching instant $t^*_x$, as shown in FIG. 6. It can be seen that the correction $\Delta t_x$ causes a correction pulse $v_{i,pp} \in \mathbb{R}^2$ of form $$v_{i,pp} = V_x \cdot (h(t - t^*_x) - h(t - t^*_x - \Delta t_x)) \tag{19}$$

composed of two step functions h(t). This is indicated as pulse pattern $u_{i,pp}$ in FIG. 4.

The response to the pulse (19) is obtained by using (10). Since the rotor flux is rejected by the nominal input as a slow external disturbance, the pulse response describes equation $$v_{i,pp} = k_1 \frac{d^3 \psi_{s,p}}{dt^3} + k_2 \frac{d\psi_{s,p}}{dt} \tag{20}$$

where $v_{i,pp} \in \mathbb{R}^2$ from equation (19). Since $v_{i,pp}$ is the difference of two step inputs, the response can be obtained by superposition of corresponding two step responses. The response to the step input $$v_{i,step}(t) = V_x \cdot h(t - t^*_s) \tag{21}$$

has a form $$\psi_{s,step}(t) = \frac{V_x}{k_2}\left((t - t^*_x) - \frac{1}{\omega_r}\sin(\omega_r(t - t^*_x))\right)h(t - t^*_x) \tag{22}$$

which is obtained by solving the differential equation by Laplace transform. Since the pulse response is $\psi_{s,pp}(t) = \psi_{s,step}(t) - \psi_{s,step}(t-\Delta t_x)$, the expression $$\psi_{s,pp}(t) = \underbrace{\frac{V_x}{k_2}\Delta t_x}_{\overline{\psi}_{s,pp}} + \underbrace{\frac{V_x}{k_2}\frac{1}{\omega}[\sin(\omega_r(t-t_x^*-\Delta t_x)) - \sin(\omega_r(t-t_x^*))]}_{\tilde{\psi}_{s,pp}} \quad (23)$$

represents the response to the pulse (19). It is valid only for time instants after the input pulse has been finished. The pulse response has two terms $$\psi_{s,pp} = \overline{\psi}_{s,pp} + \tilde{\psi}_{s,pp} \quad (24)$$

corresponding to two effects which the correction pulse makes.

The first effect comes from the non-oscillatory term $$\overline{\psi}_{s,pp} = \frac{V_x}{k_2}\Delta t_x \quad (25)$$

which is an average value. It can be shown that this term builds the change of the inverter flux. Since the inverter flux will be controlled, this term is not of particular importance and discussion.

The second effect comes from the oscillatory term $$\tilde{\psi}_{s,pp} = \frac{V_x}{k_2}\frac{1}{\omega_r}[\sin(\omega_r(t-t_x^*-\Delta t_x)) - \sin(\omega_r(t-t_x^*))] \quad (26)$$

which is an oscillation at the resonant frequency. The correction pulse leaves this oscillation behind and it gets superimposed with the undesired steady-state oscillation $\psi_{s,h}$ of the homogeneous solution.

Oscillations Described by Complex Numbers

As a consequence of the previous derivations, the predictive damping can be achieved by optimizing the oscillation integrated by pulses $\tilde{\psi}_{s,p}(t,\Delta t) \in \mathbb{R}^2$ to be opposite to the resonant oscillation $\psi_{s,h}(t) \in \mathbb{R}^2$ from (17). This way, the generated oscillation $\tilde{\psi}_{s,p}(t,\Delta t)$ will be planned to cancel the oscillation $\psi_{s,h}(t)$ which exists from the beginning of the prediction horizon. This can be achieved by griding the time axis and defining cost terms $$J_{damp,k}(\Delta t) = \|\psi_{s,h}(t_k) + \tilde{\psi}_{s,p}(t_k,\Delta t)\|^2 \quad (27)$$

where $t_k$ is a griding time instant. Each of these cost terms $J_{damp,k}(\Delta t)$ introduces a tendency of $\tilde{\psi}_{s,p}(t,\Delta t)$ to be opposite to $\psi_{s,h}(t)$ at time instant $t_k$.

This approach brings a dilemma of the most appropriate minimal number of griding instants. In order to avoid this problem, the time variable will be eliminated by representing the oscillatory functions $\tilde{\psi}_{s,p}(t,\Delta t)$ and $\psi_{s,h}(t)$ with their complex representatives $\underline{\tilde{\psi}}_{s,p}(\Delta t)$ and $\underline{\psi}_{s,h}$ defined at t=0. This way, both the information about the phase and magnitude is mapped into a complex number, and the cost term $$J_{damp}(\Delta t) = \|\underline{\psi}_{s,h} + \underline{\tilde{\psi}}_{s,p}(\Delta t)\|^2 \quad (28)$$

is used to provide the desired predictive damping. The $J_{damp}(\Delta t)$ will be denoted as $J_2(\Delta t)$ in the control optimization problem.

Optimization Problem

Define $$\Delta t = [\Delta t_{a1}, \Delta t_{a2}, \ldots, \Delta t_{an_a}, \Delta t_{b1}, \Delta t_{b2}, \ldots, \Delta t_{bn_b}, \Delta t_{c1}, \Delta t_{c2}, \ldots, \Delta t_{cn_c}], \quad (29)$$

where $\Delta t_{a1} = t_{a1} - t^*_{a1}, \ldots, \Delta t_{an} = t_{an_a} - t^*_{an_a}$, $\Delta t_{b1} = t_{b1} - t^*_{b1}, \ldots, \Delta t_{bn_b} = t_{bn_b} - t^*_{bn_b}, \Delta t_{c1} = t_{c1} - t^*_{c1}, \ldots, \Delta t_{cn_c} = t_{cn_c} - t^*_{cn_c}$.

Then the optimization problem to be solved by the Pattern Controller module step 32 of FIG. 2 is given by minimizing the cost function $$\min_{\Delta t} J(\Delta t) = \quad (30)$$

$$\|\psi_{i,err} - \psi_{i,corr}(\Delta t)\|^2 + k_{pred.damp}\|\underline{\Psi}_{s,h} + \underline{\tilde{\psi}}_{s,p}(\Delta t)\| + q\Delta t^T \Delta t$$

with $$\begin{cases} \psi_{i,err} = \psi_i^* - \psi_i & (31) \\ \psi_{i,corr}(\Delta t) = -\frac{V_{dc}}{2}P\begin{bmatrix} \sum_{i=1}^{n_a}\Delta u_{ai}\Delta t_{ai} \\ \sum_{i=1}^{n_b}\Delta u_{bi}\Delta t_{bi} \\ \sum_{i=1}^{n_c}\Delta u_{ci}\Delta t_{ci} \end{bmatrix} \\ \text{s.t.} \\ \underline{\tilde{\psi}}_{s,p}(\Delta t) = -\frac{V_{dc}}{2}\frac{1}{k_2\omega_r}\cdot P\cdot \begin{bmatrix} \sum_i \Delta u_{ai}[e^{j(\omega_r(-t^*_{ai}-\Delta t_{ai})-\pi/2)} - e^{j(\omega_r(-t^*_{ai})-\pi/2)}] \\ \sum_i \Delta u_{bi}[e^{j(\omega_r(-t^*_{bi}-\Delta t_{bi})-\pi/2)} - e^{j(\omega_r(-t^*_{bi})-\pi/2)}] \\ \sum_i \Delta u_{ci}[e^{j(\omega_r(-t^*_{ci}-\Delta t_{ci})-\pi/2)} - e^{j(\omega_r(-t^*_{ci})-\pi/2)}] \end{bmatrix} \\ 0 \leq t_{a1} \leq t_{a2} \leq \ldots \leq t_{an_a} \leq t^*_{a(n_a+1)} \\ 0 \leq t_{b1} \leq t_{b2} \leq \ldots \leq t_{bn_b} \leq t^*_{b(n_b+1)} \\ 0 \leq t_{c1} \leq t_{c2} \leq \ldots \leq t_{cn_c} \leq t^*_{c(n_c+1)} \\ \max\{\Delta t_{a1}, \Delta t_{a2}, \ldots, \Delta t_{an_a}, \Delta t_{b1}, \Delta t_{b2} \ldots, \Delta t_{bn_b}, \Delta t_{c1}, \\ \Delta t_{c2} \ldots, \Delta t_{cn_c}\} \leq \Delta t_{max} = \frac{2\pi}{18\omega_r} \end{cases}$$

In (31) also the constraints of the problem are included. The optimization problem (30), (31) may be solved in the form of a Quadratic Programming (QP).

Figure 5:
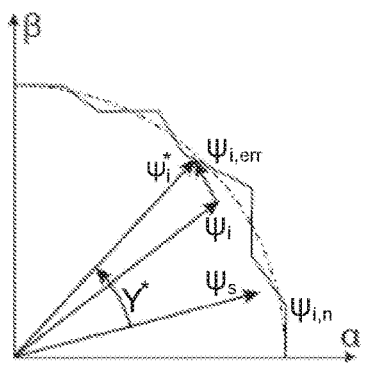
FIG. 5 shows a diagram describing a flux error vector used in the method of FIG. 2.

$\psi_{i,corr}(\Delta t)$ represents the influence of correction pulses on the inverter flux. FIG. 5 is a diagram, that shows, how the quantities used above, such as the flux error $\psi_{i,corr}(\Delta t)$, the estimated inverter flux $\psi_i$, the reference inverter flux $\psi_i^*$ and the estimated stator flux $\psi_s$ depend on each other. The curve $\psi_{i,n}$ is the estimated inverter flux overtime corresponding to the selected optimized pulse pattern $u_{i,n}$.

The cost function $J(\Delta t)$ involves three terms.

The first term $\|\psi_{i,err} - \psi_{i,corr}(\Delta t)\|^2$, which is quadratic in the norm, results in tracking of specified steady-state reference by forcing the inverter flux in direction to the nominal trajectory which provides the lowest THD and the required torque.

The second term $k_{pred.damp}\|\underline{\psi}_{s,h} + \underline{\tilde{\psi}}_{s,p}(\Delta t)\|$ provides predictive damping by introducing a tendency of correction pulses to generate such oscillation behind them which will cancel the oscillation currently existing in the system 10. The coefficient of the second term $k_{pred.damp}$ may be seen as a gain that can be used to turn on or off the predictive damping part of the cost function or that may be used to tune the second term with respect to the first term.

The third term $q\Delta t^T \Delta t$ penalizes the deviations from nominal switching instants by a weighting q to avoid large corrections.

The reference inverter flux $\psi^*_i$ may be read out from stored data, which for example may be stored together with the optimized pulse pattern $u_{i,n}$.

The estimated inverter flux $\psi_i$ may be computed/estimated online from the previously applied inputs. Therefore, the quantity $\psi_{i,err}$ may be available to the module/step 32 and does not depend on the vector decision variables $\Delta t$.

The homogeneous solution $\underline{\psi}_{s,h}$ is computed according to equation (17) in the ID document, by using the filtered data in equation (1).

The expression for the pulse response oscillation $\tilde{\psi}_{s,p}(\Delta t)$ may be further linearized and the last constraint may guarantee that the linearization stays very close to the actual values.

Results

FIG. 6 shows an example of an optimized pulse pattern $u_{i,n}$, with a number of d=8 pulses during a quarter of a period.

Figure 7:
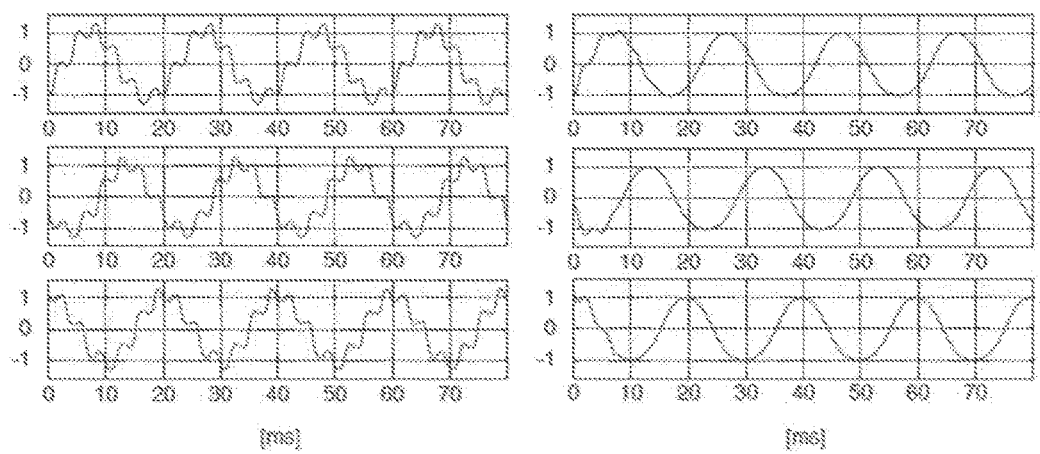
FIG. 7 shows diagrams with stator currents without damping and with damping provided by the method of FIG. 2.

The FIG. 7 show that the proposed control method exhibits excellent damping performance. The left diagrams are stator current of three phases over time that are generated, when the controller 18 of FIG. 2 performs the above described method with $k_{pred.damp}$=0. The left diagrams show the stator current of three phases, when $k_{pred.damp}$ is set to 1, i.e. predictive damping is switched on. The predictive damping term of the cost function is able to effectively attenuate the oscillations present in the left diagrams.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS

10 electrical converter system
12 inverter/electrical converter
14 LC filter/resonant subsystem
16 electrical machine/load
18 controller
20 filtering module/step
22 oscillation module/step
24 speed controller module/step
26 torque controller module/step
28 flux controller module/step
30 pattern selector module/step
32 pattern controller module/step
x system output/measurement values
$x_{\omega_r}$ filtered values
$\psi_{s,h}$ homogeneous solution
$\omega^*_m$ reference speed/reference output
$\omega_m$ estimated speed/estimated output
$T^*_i$ reference torque
$\psi_s$ estimated stator flux
$\psi^*_i$ reference inverter flux
$<\psi_s+\gamma^*$ reference angle for the inverter flux
$V_{DC}$ DC link voltage
m modulation index
d pulse number
$u_{i,n}$ optimized pulse pattern
$\psi_{i,err}$ inverter flux error
$u_i$ modified pulse pattern
$t^*$ switching instant
$T_p$ horizon

The invention claimed is:

1. A method for controlling an electrical converter system, the method comprising:
   determining a reference output ($\omega_m^*$) and an estimated output ($\omega_m$) of the electrical converter system based on measurements in the electrical converter system;
   determining an optimized pulse pattern ($u_{i,n}$) by selecting from a table of precalculated optimized pulse patterns, which is chosen based on the reference output ($\omega_m^*$) and the estimated output ($\omega_m$),
   an optimized pulse pattern comprising a sequence of switching instants ($t^*$) applied to the electrical converter system;
   determining a resonant oscillation ($\psi_{s,h}$) in the electrical converter system,
   whereby the resonant oscillation ($\psi_{s,h}$) is caused by an electrical machine of the electrical converter system and a LC filter of the electrical converter system;
   determining a sequence of future states of the electrical converter system by solving a mathematical model of the electrical converter system subject to optimizing a cost function and subject to a constraint that a modified pulse pattern ($u_i$) is applied to the electrical converter system, which modified pulse pattern ($u_i$), comprises time shifted switching instants with respect to the optimized pulse pattern ($u_{i,n}$), wherein the cost function comprises a term compensating the resonant oscillation ($\psi_{s,h}$) with a pulse response oscillation caused by the time shifted switching instants of the modified pulse pattern ($u_i$) and wherein the mathematical model is constrained such that the switching instants of the modified pulse pattern (ui) have the same order as the switching instants of the optimized pulse pattern (ui,n);
   applying the modified pulse pattern ($u_i$) to the electrical converter system.

2. The method of claim 1,
   wherein the resonant oscillation ($\psi_{s,h}$) in the electrical converter system is determined by determining coefficients ($X_{\omega_r}$) of a homogeneous solution of the mathematical model of the electrical converter system, wherein the coefficients are determined based on the measurements in the electrical converter system; and/or
   wherein the resonant oscillation ($\psi_{s,h}$) is caused by the LC filter.

3. The method of claim 2, wherein the pulse response oscillation is based on a solution of the mathematical model with respect to voltage pulses resulting from a difference between the optimized pulse pattern ($u_{i,n}$) and the modified pulse pattern ($u_i$).

4. The method of claim 2, wherein the term of the cost function compensating the resonant oscillation with the pulse response oscillation is based on the norm of the sum of a function of the resonant oscillation and a function of the pulse response oscillation.

5. The method of claim 2,
wherein the mathematical model is based on a differential equation of a stator flux ($\psi_s$); and/or
wherein the future states are future stator fluxes; and/or
wherein the resonant oscillation and/or the pulse response oscillation are an oscillation of a stator flux.

6. The method of claim 1,
wherein the pulse response oscillation is based on a solution of the mathematical model with respect to voltage pulses resulting from a difference between the optimized pulse pattern ($u_{i,n}$) and the modified pulse pattern ($u_i$).

7. The method of claim 6, wherein the term of the cost function compensating the resonant oscillation with the pulse response oscillation is based on the norm of the sum of a function of the resonant oscillation and a function of the pulse response oscillation.

8. The method of claim 6,
wherein the mathematical model is based on a differential equation of a stator flux ($\psi_s$); and/or
wherein the future states are future stator fluxes; and/ or
wherein the resonant oscillation and/or the pluse response oscillation are an oscillation of a stator flux.

9. The method of claim 1,
wherein the term of the cost function compensating the resonant oscillation with the pulse response oscillation is based on the norm of the sum of a function of the resonant oscillation and a function of the pulse response oscillation.

10. The method of claim 9,
wherein the mathematical model is based on a differential equation of a stator flux ($\psi_s$); and/or
wherein the future states are future stator fluxes; and/or
wherein the resonant oscillation and/or the pulse response oscillation are an oscillation of a stator flux.

11. The method of claim 1,
wherein the mathematical model is based on a differential equation of a stator flux ($\psi_s$); and/or
wherein the future states are future stator fluxes; and/or
wherein the resonant oscillation and/or the pulse response oscillation are an oscillation of a stator flux.

12. The method of claim 1,
wherein the cost function comprises a term minimizing the time shifts of the switching instants of the modified pulse pattern ($u_i$) with respect to the optimized pulse pattern ($u_{i,n}$).

13. The method of claim 1,
wherein the cost function comprises a term minimizing a difference between a flux error ($\psi_{i,err}$) and a correction flux representing an influence of the time shifted switching instants of the modified pulse pattern ($u_{i,n}$).

14. The method of claim 13,
wherein the flux error is the difference of a reference output predetermined for the optimized pulse pattern and an estimated flux estimated from a previously applied modified pulse pattern ($u_i$).

15. The method of claim 1,
wherein the reference output and the estimated output are a reference speed and an estimated speed and/or a reference torque and an estimated torque, and/or a reference flux and an estimated flux, of a load and/or the LC filter of the electrical converter system.

16. The method of claim 1,
wherein the sequence of future states is determined every time instant over a horizon ($T_p$) of more than one time instant.

17. A system comprising:
a computer with a processor and with a memory connected to the processor; and
a computer program, which, when executed by the processor, is adapted for performing the following steps:
determining a reference output ($\omega_m^*$) and an estimated output ($\omega_m$) of the electrical converter system based on measurements in the electrical converter system; determining an optimized pulse pattern ($u_{i,n}$) by selecting from a table of precalculated optimized pulse patterns, which is chosen based on the reference output ($\omega_m^*$) and the estimated output ($\omega_m$), an optimized pulse pattern including a sequence of switching instants ($t^*$) applied to the electrical converter system; determining a resonant oscillation ($\psi_{s,h}$) in the electrical converter system, the resonant oscillation ($\psi_{s,h}$) is caused by an electrical machine and a LC filter of the electrical converter system; determining a sequence of future states of the electrical converter system by solving a mathematical model of the electrical converter system subject to optimizing a cost function and subject to a constraint that a modified pulse pattern ($u_i$) is applied to the electrical converter system, which modified pulse pattern ($u_i$) comprises time shifted switching instants with respect to the optimized pulse pattern ($u_{i,n}$), wherein the cost function comprises a term compensating the resonant oscillation ($\psi_{s,h}$) with a pulse response oscillation caused by the time shifted switching instants of the modified pulse pattern ($u_i$) and wherein the mathematical model is constrained such that the switching instants of the modified pulse pattern (ui) have the same order as the switching instants of the optimized pulse pattern (ui,n); applying the modified pulse pattern ($u_i$) to the electrical converter system.

18. A non-transitory computer-readable medium with instructions stored thereon, that when executed by a processor, perform the steps comprising:
determining a reference output ($\omega_m^*$) and an estimated output ($\omega_m$) of the electrical converter system based on measurements in the electrical converter system; determining an optimized pulse pattern ($u_{i,n}$) by selecting from a table of precalculated optimized pulse patterns, which is chosen based on the reference output ($\omega_m^*$) and the estimated output ($\omega_m$), an optimized pulse pattern including a sequence of switching instants ($t^*$) applied to the electrical converter system; determining a resonant oscillation ($\psi_{s,h}$) in the electrical converter system, the resonant oscillation ($\psi_{s,h}$) is caused by an electrical machine and a LC filter of the electrical converter system; determining a sequence of future states of the electrical converter system by solving a mathematical model of the electrical converter system subject to optimizing a cost function and subject to a constraint that a modified pulse pattern ($u_i$) is applied to the electrical converter system, which modified pulse pattern ($u_i$) comprises time shifted switching instants with respect to the optimized pulse pattern ($u_{i,n}$) wherein the cost function comprises a term compensating the resonant oscillation ($\psi_{s,h}$) with a pulse response oscillation caused by the time shifted switching instants of the modified pulse pattern ($u_i$) and wherein the mathematical model is constrained such that the switching instants of the modified pulse pattern (ui) have the same order as the switching instants of the optimized pulse pattern (ui,n); applying the modified pulse pattern ($u_i$) to the electrical converter system.

19. A controller adapted to determine a reference output ($\omega_m^*$) and an estimated output ($\omega_m$) of an electrical converter system based on measurements in the electrical converter system; determine an optimized pulse pattern ($u_{i,n}$) by selecting from a table of precalculated optimized pulse patterns, which is chosen based on the reference output ($\omega_m^*$) and the estimated output ($\omega_m$), an optimized pulse pattern including a sequence of switching instants (t*) applied to the electrical converter system; determine a resonant oscillation ($\psi_{s,h}$) in the electrical converter system, the resonant oscillation ($\psi_{s,h}$) is caused by an electrical machine and a LC filter of the electrical converter system; determine a sequence of future states of the electrical converter system by solving a mathematical model of the electrical converter system subject to optimizing a cost function and subject to a constraint that a modified pulse pattern ($u_i$) is applied to the electrical converter system, which modified pulse pattern ($u_i$) comprises time shifted switching instants with respect to the optimized pulse pattern ($u_{i,n}$), wherein the cost function comprises a term compensating the resonant oscillation ($\psi_{s,h}$) with a pulse response oscillation caused by the time shifted switching instants of the modified pulse pattern ($u_i$) and wherein the mathematical model is constrained such that the switching instants of the modified pulse pattern (ui) have the same order as the switching instants of the optimized pulse pattern (ui,n); applying the modified pulse pattern ($u_i$) to the electrical converter system.

20. An electrical converter system, comprising:
an electrical converter;
a resonant system interconnected with the electrical converter;
a controller according to claim 19 adapted for determining resonant oscillations caused by the resonant system and for damping the resonant oscillations in the electrical converter system.

\* \* \* \* \*